US007179427B2

(12) United States Patent
Marchant et al.

(10) Patent No.: US 7,179,427 B2
(45) Date of Patent: Feb. 20, 2007

(54) APPARATUS FOR COUNTERCURRENT CONTACTING OF GAS AND SOLIDS

(75) Inventors: Paul E. Marchant, Houston, TX (US); Dalip S. Soni, Houston, TX (US); Leonce Castagnos, Montgomery, TX (US)

(73) Assignee: ABB Lummus Global Inc., Bloomfield, NJ (US)

( * ) Notice: Subject to any disclaimer, the term of this patent is extended or adjusted under 35 U.S.C. 154(b) by 560 days.

(21) Appl. No.: 10/303,452

(22) Filed: Nov. 25, 2002

(65) Prior Publication Data

US 2004/0101449 A1    May 27, 2004

(51) Int. Cl.
*B32B 5/02* (2006.01)
*B32B 27/12* (2006.01)
*B32B 27/04* (2006.01)

(52) U.S. Cl. .................. 422/144; 422/145; 422/147
(58) Field of Classification Search ............... 422/144, 422/145, 147
See application file for complete search history.

(56) References Cited

U.S. PATENT DOCUMENTS

| 2,697,881 | A | | 12/1954 | Kelley |
| 4,572,780 | A | | 2/1986 | Owen et al. |
| 4,689,206 | A | | 8/1987 | Owen et al. |
| 4,741,883 | A | * | 5/1988 | Haddad et al. ............ 422/144 |
| 4,985,209 | A | | 1/1991 | Renard et al. |
| 5,248,411 | A | | 9/1993 | Chan |
| 5,273,720 | A | | 12/1993 | Zinke |
| 5,449,498 | A | | 9/1995 | Cetinkaya |
| 5,462,717 | A | * | 10/1995 | Pfeiffer .................... 422/146 |
| 5,474,669 | A | | 12/1995 | Cetinkaya |
| 5,531,884 | A | | 7/1996 | Johnson et al. |
| 5,549,814 | A | | 8/1996 | Zinke |
| 5,565,177 | A | | 10/1996 | Cetinkaya |
| 5,656,243 | A | * | 8/1997 | Luckenbach et al. ....... 585/484 |
| 5,858,207 | A | | 1/1999 | Lomas |
| 6,162,402 | A | | 12/2000 | Lomas |
| 6,224,833 | B1 | | 5/2001 | Rall |
| 6,248,298 | B1 | * | 6/2001 | Senior et al. ............... 422/144 |
| 6,680,030 | B2 | * | 1/2004 | Koebel et al. .............. 422/144 |
| 6,723,292 | B2 | * | 4/2004 | Lu et al. .................... 422/144 |
| 6,780,308 | B1 | * | 8/2004 | Hedrick et al. ............. 208/113 |
| 6,875,406 | B1 | * | 4/2005 | Hubinger et al. ........... 422/144 |
| 2005/0040075 | A1 | * | 2/2005 | Cerqueira et al. .......... 208/113 |

FOREIGN PATENT DOCUMENTS

| EP | 0 081 267 | * | 6/1983 |
| EP | 0081267 | | 6/1983 |

* cited by examiner

Primary Examiner—N. Bhat
(74) Attorney, Agent, or Firm—Dilworth & Barrese, LLP

(57) ABSTRACT

An apparatus for the countercurrent contacting of a gas and downflowing solid particles includes a housing and a plurality of baffles positioned within the housing. The baffles are arranged in at least first and second vertically spaced levels in successively lower position, each of the first and second levels including a row of at least two baffles oriented parallel to one another and inclined from horizontal so as to facilitate movement of the solid particles and provide the maximum area for flow. Baffles are oriented so as to laterally shift the direction of downflowing particles transversely as the particles move from one level to the next lower level and avoid channeling of the phases. The number of baffles, length and spacing is optimized to provide maximum interfacial area for interaction between the phases.

16 Claims, 9 Drawing Sheets

APPARATUS FOR COUNTERCURRENT CONTACTING OF GAS AND SOLIDS

BACKGROUND OF THE INVENTION

1. Field of the Invention

The present invention relates to an apparatus for countercurrent contacting of gas and fluidized solids, and particularly to a stripper for a fluid catalytic cracking process.

2. Background of the Art

Various chemical, petroleum refining and combustion processes require contacting fluidized solid particles with an up-flowing gas to achieve efficient mass and or heat transfer. Such systems could also be used to carry out chemical reaction by efficient countercurrent contacting of the phases. One such widely used application is in a very important process known as fluid catalytic cracking ("FCC"), which has been used in petroleum refining for many years for converting heavier (or high boiling) hydrocarbon compounds to more valuable lighter (or low boiling) components. There are many different configurations of FCC units but all are essentially comprised of the same functional pieces of equipment. Generally, FCC units include a riser, which is a vertical pipe reactor in which the cracking reaction takes place. The hydrocarbon feed, generally in liquid form, is introduced at the bottom of the riser where it is contacted with hot regenerated catalyst. The catalyst being in the form of a fine powder, readily mixes with the oil and gives up heat to vaporize the oil and sustain the cracking reaction. Both the catalyst and hydrocarbon flow upward through the riser. It is advantageous to maximize the ratio of catalyst to oil for improved conversion in the riser. The residence time in the riser is typically less than about 10 seconds. A riser termination device at the top of the riser separates the reaction products (in a vapor phase) from the catalyst. The product vapors exit the FCC unit and are sent on to further processing. The catalyst particles, which are covered with coke from the cracking reaction, are sent to a regenerator wherein the coke is burned off in a stream of oxidizing gas (usually air). The catalyst coming from an atmosphere of hydrocarbon vapors will have hydrocarbons in the pores of the catalyst and between the catalyst particles. Before the catalyst can be sent to the regenerator it is advantageous to first strip the catalyst of entrained hydrocarbons or the hydrocarbons located in the pores of the catalyst. This is usually accomplished by contacting the downflow of catalyst particles with an upflow of steam. Efficiency of the stripping unit is important as unrecovered/unremoved hydrocarbons represent a loss of valuable product. The unrecovered/unremoved hydrocarbons also put an additional load on the regenerator in terms of burning a greater mass of hydrocarbons which would require additional quantity of oxidizing or combustion air. The regenerator would also operate at a higher temperature which would lower the catalyst to oil ratio and degrade the unit performance with regard to operating flexibility and the yield of valuable products. In addition, the hydrogen rich entrained hydrocarbons would yield higher steam partial pressure in the regenerator which would increase catalyst deactivation.

Referring to FIG. 1 a schematic view of a prior art FCC unit is shown. A high boiling feed such as gas oil or vacuum gas oil, or even heavier feed, is added to a riser reactor 6 through feed injection ports 2 where it mixes with the regenerated catalyst particles. The cracking reaction is completed in the riser and the cracked hydrocarbons and spent catalyst are diverted by elbow 10 through cyclones 12 which separate most of the spent catalyst from the product. Vapor from cyclone 12 along with the remaining catalyst particles is directly sent to cyclone 16 which removes most of the remaining catalyst. A small amount of cracked hydrocarbon vapor is carried down the diplegs of the cyclones along with the separated catalyst.

Spent catalyst is discharged down from the dipleg of cyclones 12 and 16 into catalyst stripper 8, where one or more stages of steam stripping occur. Stripping steam is injected via lines 19 and 21 either at the bottom of the vessel or at some intermediate point between the top and bottom of the vessel. The stripped hydrocarbons and stripping steam pass upward into disengager 14 and are removed with the cracked products after passage through the special openings in cyclones 12. There are many other cyclonic and non-cyclonic arrangements and devices for separating catalyst and cracked hydrocarbon vapor at the outlet of the riser reactor. However, the purpose of these other devices and arrangements is the same, i.e., to separate the catalyst particles from the cracked hydrocarbon vapors.

Stripped catalyst is discharged down through standpipe 26 into the horizontal catalyst transfer line 27. The flow of catalyst is controlled by a valve 36. Air is injected via line 28 into the transfer line 27, which causes the spent catalyst to be transported to the regenerator by dilute phase transport through transfer line 27 and lift line 29. One skilled in the art would appreciated that there are other suitable methods of transferring catalyst which can alternatively be employed.

Catalyst is regenerated in regenerator 24 by contact with air added via air lines and an air grid distributor (not shown). A catalyst cooler 28 may be provided so that heat can be removed from the regenerator in certain operations when higher boiling feeds are processed.

Regenerated catalyst is withdrawn from the regenerator via duct 34 into through hopper 31, standpipe 33 and valve assembly 30 and transported through lateral line 32 into the base of the riser reactor. Flue gas and some entrained catalyst are discharged into a dilute phase region in the upper portion of regenerator 24. Catalyst entrained with the flue gas is separated from the flue gas in multiple stages of cyclones 4. Separated catalyst is returned to the catalyst bed in the regenerator through diplegs 35. The flue gas is discharged through plenum 20, cooled to recover the sensible heat and discharged into the atmosphere.

A typical FCC unit catalyst stripper uses circular, conical baffles to facilitate the contacting of the catalyst with the stripping steam. The conical baffles are usually deeply inclined so as to prevent catalyst from reposing on the baffle. FIG. 2 shows a typical prior known arrangement of baffles in a stripper 40 including outwardly slanted baffles 41 alternating with inwardly slanted baffles 42. The baffles 41 and 42 tend to laterally shift the downflow S of catalyst particles back and forth against the upflow G of stripping gas to increase solid-vapor contact and mass transfer. However, it has been found that as the catalyst mass flux is increased through the stripper, the efficiency of mass transfer (or hydrocarbon removal in the case of FCC strippers), is reduced. Beyond a certain point the efficiency can drop off very sharply. Accordingly, a method and apparatus for achieving high efficiency mass transfer between downflowing fluidized particles and upflowing gas is needed.

SUMMARY OF THE INVENTION

An apparatus is provided herein for the countercurrent contacting of a gas and downflowing fluidized solid particles. The apparatus comprises: a housing at least partially defining an interior space; and, a plurality of baffles positioned and oriented within the interior space of the housing, the baffles being arranged in at least first and second vertically spaced levels in successively lower position. Each of the first and second levels include a row of at least two baffles oriented parallel to one another and inclined from horizontal orientation so as to make the downflowing solids flow smoothly through the housing and not to restrict the cross section area available. Additionally successive levels of baffles are arranged to laterally shift the direction of downflowing particles as the particles move from one level to the next lower level. Typically successive layers are arranged perpendicular to each other but other angles of rotation may be used to meet installation or process requirements.

The apparatus can advantageously be combined with an FCC unit to achieve more efficient mass transfer between the up flowing gas and the down flowing fluidized particles. The apparatus is designed so that there is maximum contact between the phases and channeling of the phases is avoided. Also maximum "interfacial surface" area is available for mass transfer between the phases.

BRIEF DESCRIPTION OF THE DRAWINGS

Various embodiments are described below with reference to the drawings wherein.

DETAILED DESCRIPTION OF THE PREFERRED EMBODIMENT(S)

Figure 1:
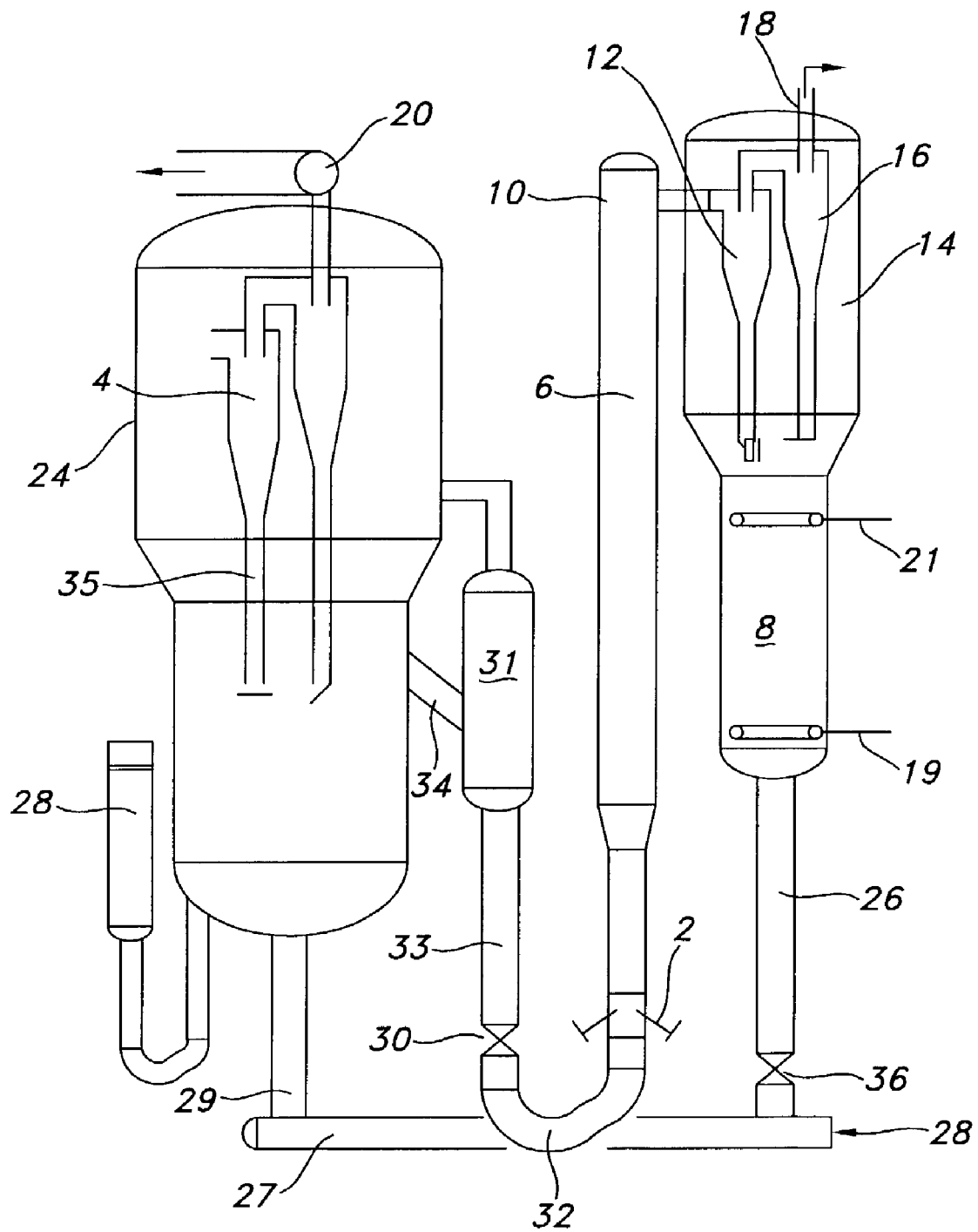
FIG. 1 is schematic of a prior art FCC unit.
Figure 2:
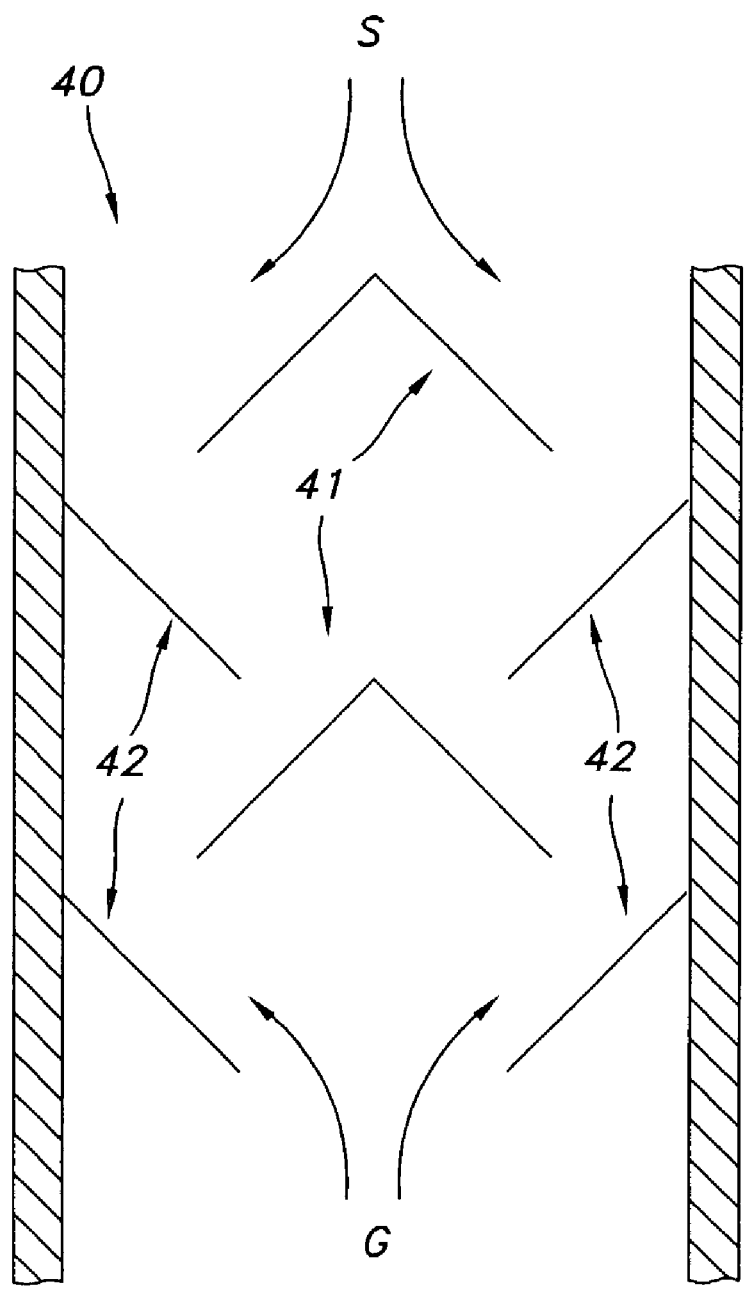
FIG. 2 is a schematic of a prior art stripper.

The apparatus of the present invention can be employed in any application wherein countercurrent flows of solid particles and gas are contacted. Typically, such contacting is for the purpose of mass transfer or carrying out a chemical reaction between the phases, but it can also be for the purpose of heat transfer. The invention is particularly advantageous for use in strippers for FCC units and can advantageously be combined with an FCC unit such as shown in FIG. 1, but the scope of the invention is not limited to such use.

Figure 3:
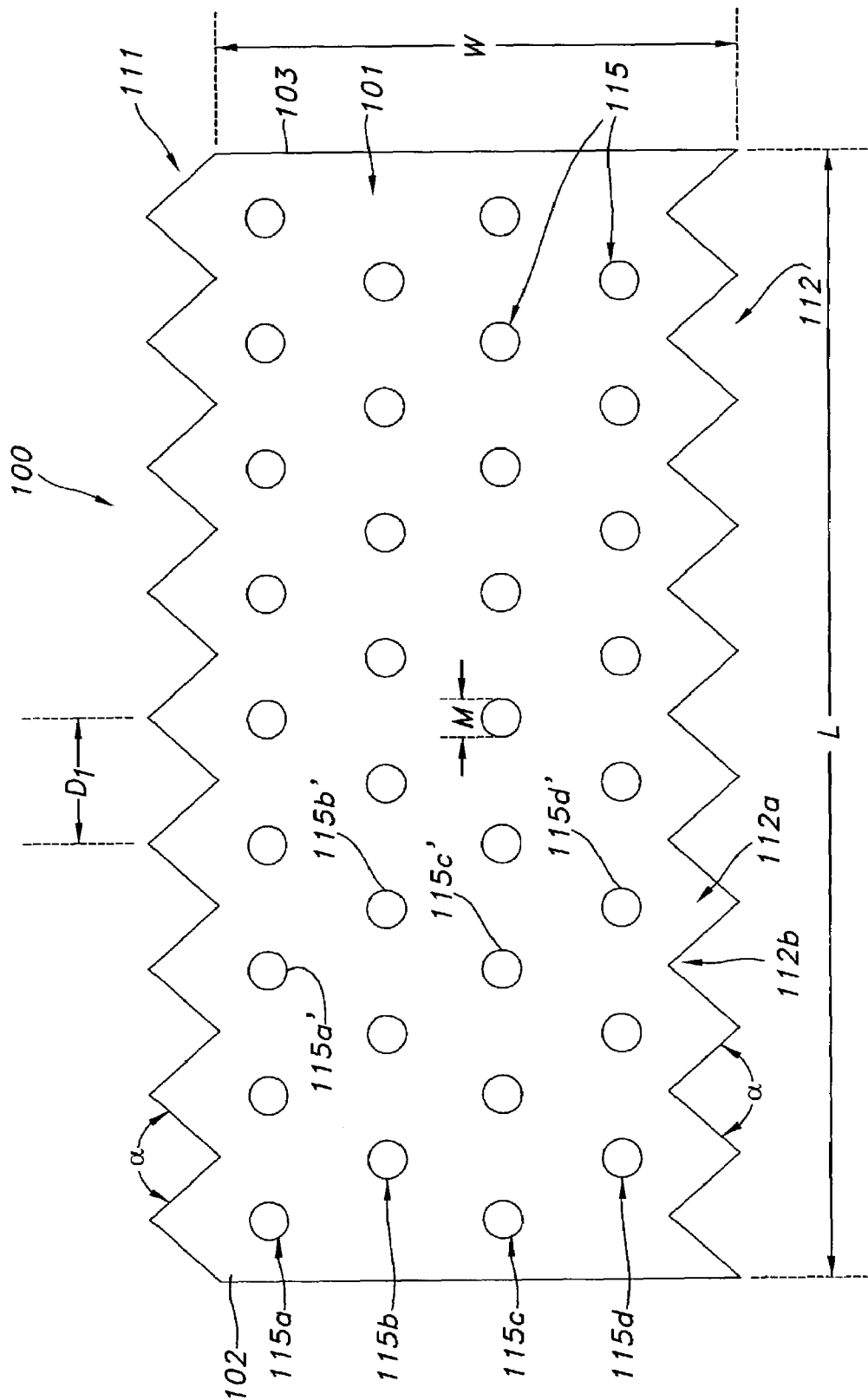
FIG. 3 is a face view of a baffle plate according to the present invention.

The contacting apparatus of the present invention employs baffle plates in an array having a unique configuration. Referring now to FIG. 3, an individual baffle 100 is shown wherein baffle 100 is fabricated from a plate 101 of suitable material such as metal, ceramic, or engineering plastic (e.g., polycarbonate, acrylic, polyvinyl chloride, nylon, acetal, polysulfone, and the like), depending upon operating temperature and other service conditions.

Plate 101 has first and second straight sides 102 and 103, respectively. Preferably, plate 101 is planar, although curved plates may alternatively be employed. Upper side 111 preferably is serrated and includes alternating teeth 111a and notches 111b of generally V-shaped configuration. The notches define an angle α which can preferably range from about 60° to 120°, more preferably from about 80° to about 100°, and yet more preferably from about 88° to 92°. Most preferably, α is equal to 90°. Lower side 112 of the plate 101 also is preferably serrated and includes alternating teeth 112a and notches 112b. Notches 112b also define an angle α as described above. The serrations of side 112 alternate with those of side 111 such that the notches 112b of the lower side 112 are vertically aligned with the teeth 111a of side 111, and the teeth 112a of side 112 are vertically aligned with the notches 111b of side 111.

Baffle plate 101 also includes a plurality of apertures 115 in a series of rows in staggered arrangement. At least two and preferably 4, 6 or more rows of apertures are in each plate 101. For illustrative purposes, rows 115a, 115b, 115c and 115d of apertures are shown in FIG. 3. The apertures of rows 115a and 115c, as exemplified by apertures 115a' and 115c', are vertically aligned with the teeth 111a and notches 112b. The apertures of alternate rows 115b and 115d, as exemplified by apertures 115b' and 115d', are vertically aligned with notches 111b and teeth 112a.

The size of the teeth, notches, and apertures may be selected depending upon the particle size of the solids, the volume of throughput, etc. By way of example, for a typical size of FCC catalyst (e.g., 20–160 microns diameter) the diameter M of apertures 115 can optionally range from about 0.5 inches to about 6 inches, and is typically from about 1.5 inches to about 3.0 inches. Dimensions outside of these ranges can also be used when appropriate.

The length L and width W of baffle 100 can be selected in accordance with the size of the apparatus. Typically, length L ranges from about 24 inches to about 240 inches, and width W ranges from about 6 inches to about 24 inches. The tooth to tooth distance $D_1$ can optionally range from about 2.0 inches to about 12.0 inches. Dimensions outside of these ranges can also be used when appropriate.

The present invention facilitates solid contact by more evenly distributing the downflow of solids through the interior of the apparatus. Channeling of solids into limited areas is inhibited as the flow of solids is shifted in direction so as to maximize the interior volume in which gas solids contact can effectively be made.

Figure 4:
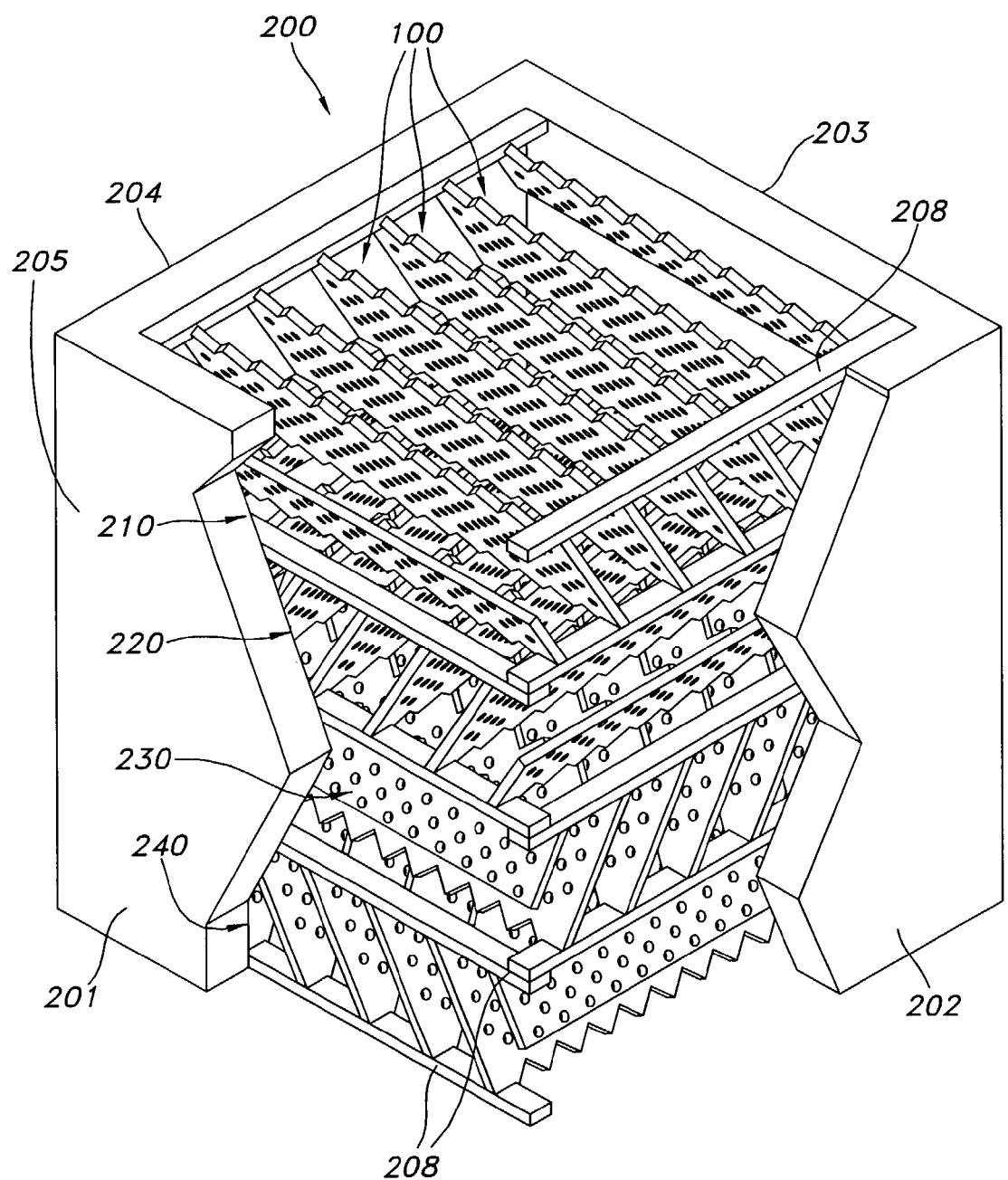
FIGS. 4, 5, and 6, are, respectively, perspective, front elevational and side elevational views of a gas-solid contacting apparatus according to the invention.
Figure 5:
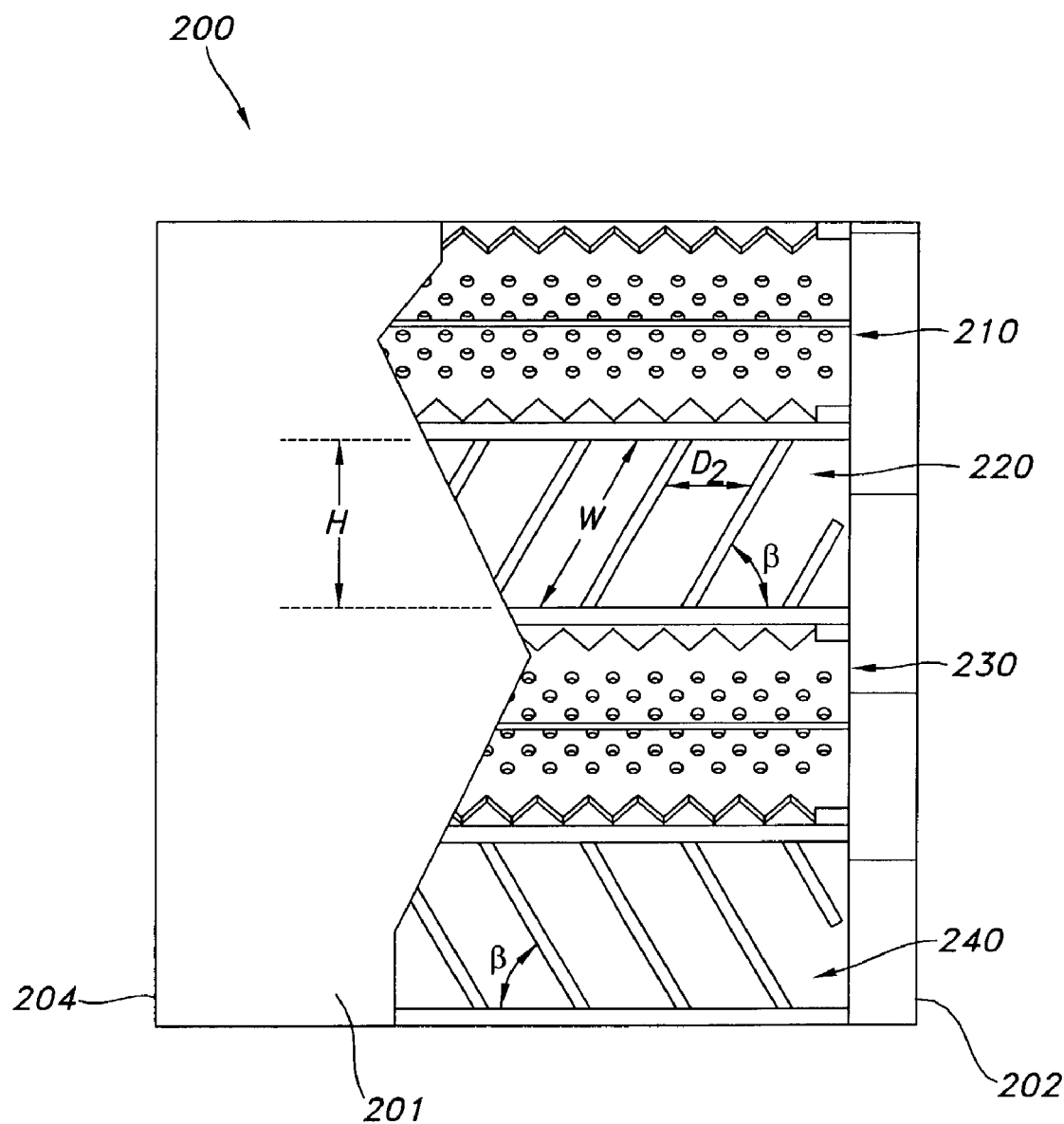
Figure 6:
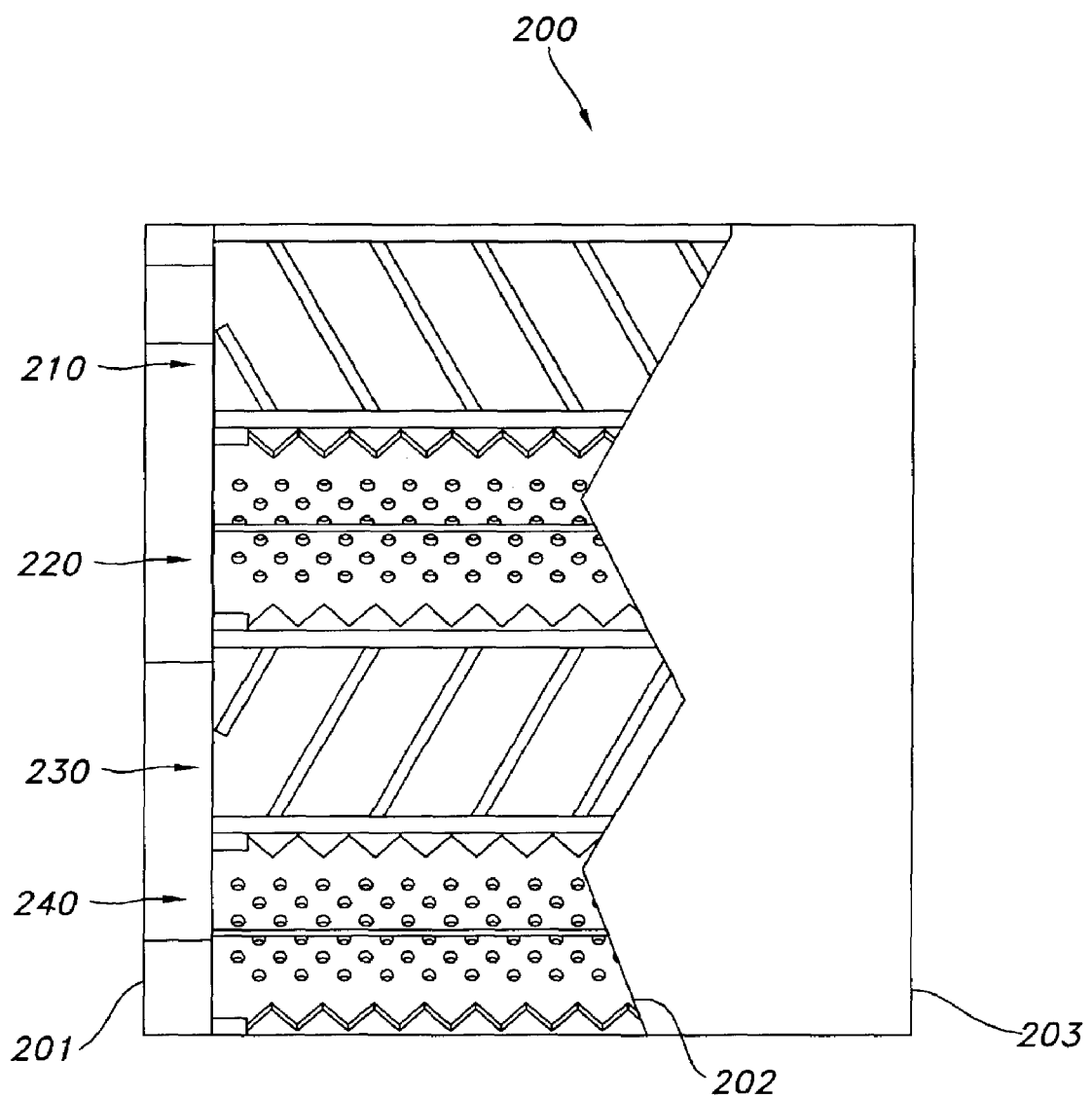

Referring now to FIGS. 4, 5, and 6, a solid-gas contacting apparatus 200 (e.g., a stripper) is illustrated. Apparatus 200 includes a housing 205 defining an interior space and having first, second, third and fourth sides 201, 202, 203, 204, respectively. An interior framework 208 supports first, second, third and fourth rows (210, 220, 230, 240, respectively), of baffles 100. The baffles can be supported in any of a variety of ways. Interior framework 208 is an example of a suitable means of support. The height H of each row of baffles can optionally range from about 3 inches to about 30 inches, and more typically can range from about 10 inches to about 18 inches. Dimensions outside of these ranges can also be used when appropriate. Any number of baffles can be positioned in a row depending upon the size of the apparatus, the desired throughput, and/or other service conditions. Generally, 5 to 15 baffles are included in each row, although numbers outside of this range may also be used when deemed suitable. As can be seen from FIGS. 4 to 6, the baffles 100 are included such that the baffles within a row are parallel, but the rows each slant downward in a different direction. For example, baffles 100 in row 210 slant downward toward side 203; baffles 100 in row 220 slant downward towards side 204; baffles 100 in row 230 slant downward towards side 201; and baffles 100 in row 240 slant downward towards side 202. Thus, the downflow of solids is shifted towards each of the four sides of the apparatus. More particularly, the lateral component of the direction of flow of the solid particles is shifted by 90° as the particles flow from one level to the next level below. Lateral direction changes optionally may be from about 45° to about 180° depending on the angle of rotation of successive layers of baffles.

The angle of incline β of the baffles 100 (i.e., the angle with respect to the horizontal orientation) preferably ranges from about 20° to about 80°, more preferably from about 50° to about 60°. Angle β should be great enough to prevent solids from reposing or accumulating on the baffles. The optimum angle β can depend on the nature of the solids, the particle size and particle shape.

Figure 7:
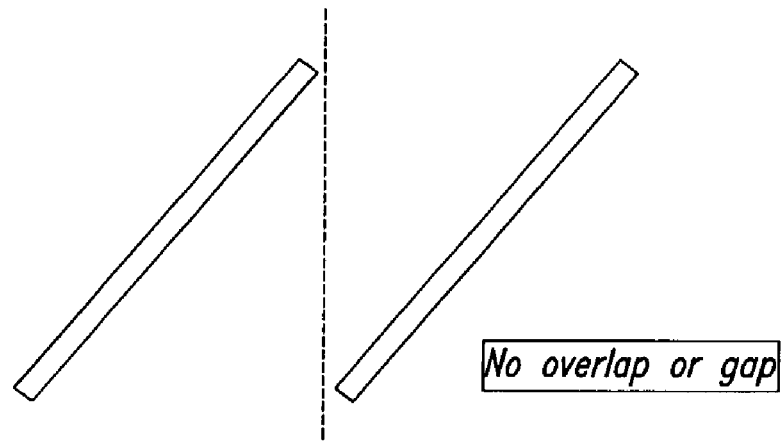
FIG. 7 is a diagram illustrating the spacing between baffles.
Figure 7:
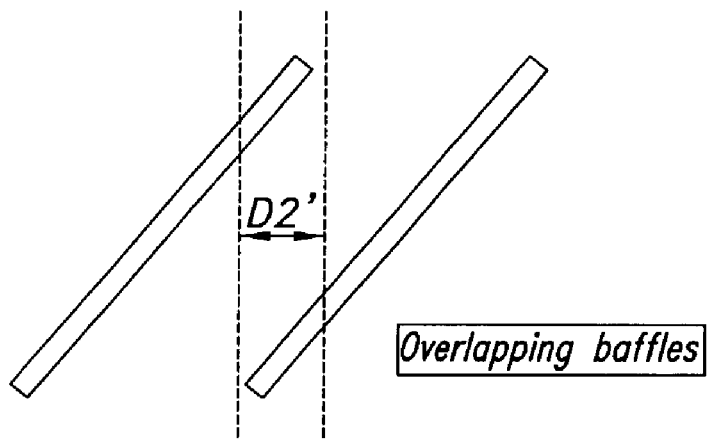
Figure 7:
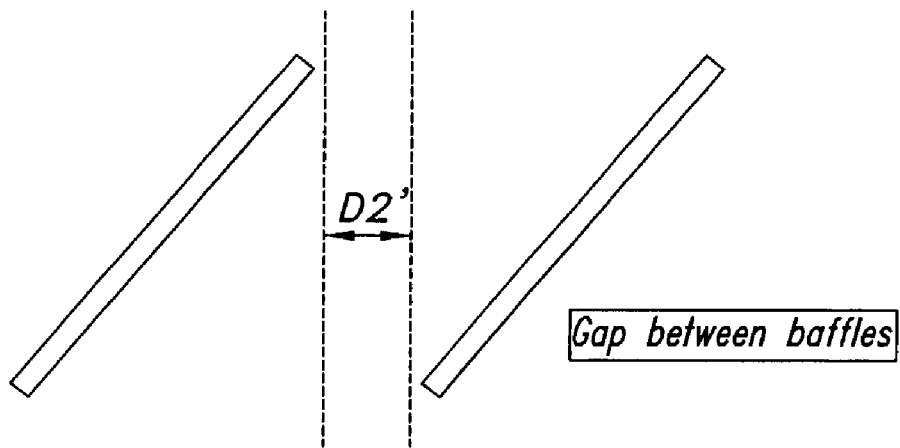

The spacing $D_2$ between the baffles is defined by the amount of overlap or gap between the upper and lower edges of adjacent baffles. Referring to FIG. 7, the upper and lower edges may be directly aligned with no gap or overlap. Alternatively, there may be either an overlap or gap of dimension D2'. The dimension $D_2$ is thus dependent on the amount of overlap or gap and the angle β and the width W of the baffle plate and typically can range from 3 to 30 inches, although dimensions outside of this range can also be used when appropriate.

The gas-solid contacting apparatus 200, when used for stripping entrained hydrocarbon vapor from catalyst particles in a FCC unit, will typically be sized and configured to accommodate a catalyst residence time of about 5 seconds to 200 seconds, a catalyst flow of from about 5 lbs/ft²-sec to about 50 lbs/ft²-sec, a stripping gas flow of from about 0.5 lbs/1000 lbs catalyst to about 5.0 lbs/1000 lbs catalyst. While these ranges are typical for an FCC unit other processes may require higher or lower values.

Figure 8:
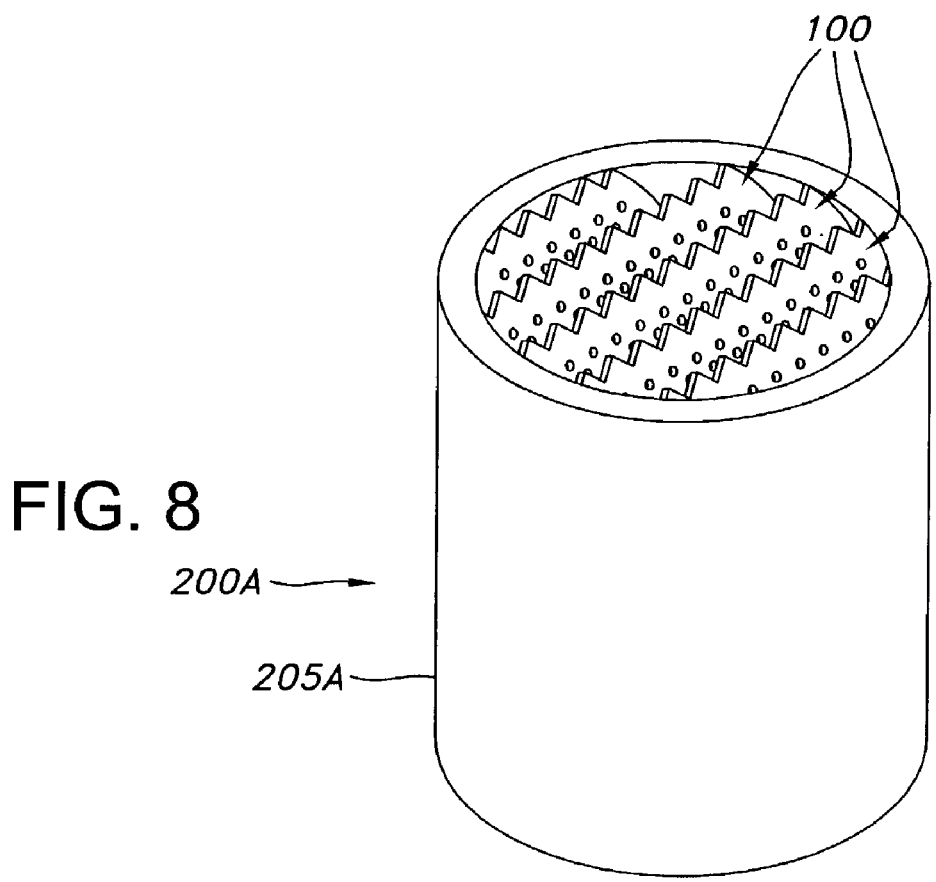
FIG. 8 is a diagrammatic perspective view illustrating an alternative configuration of the gas-solid contacting apparatus.
Figure 9:
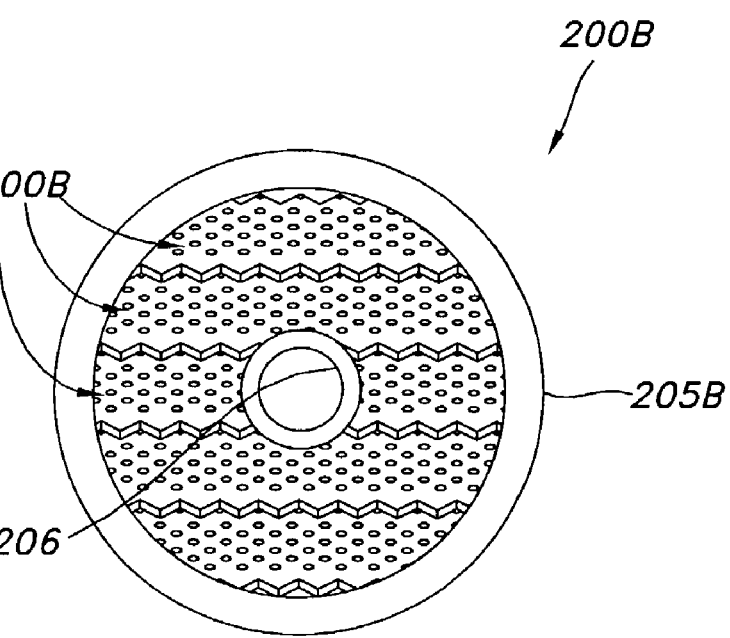
FIG. 9 is a diagrammatic plan view illustrating yet another configuration of the gas-solid contacting apparatus; and, FIG. 10 is a graph of baffle performance vs. mass flux showing the superior efficiency of the invention.

While the gas-solid contacting apparatus 200 is illustrated having a quadrangular cross section in plan view, other configurations can alternatively be employed. Referring to FIG. 8, a gas-solid contacting apparatus 200A includes a generally cylindrical housing 205A with a circular cross-section in which baffles 100 are positioned. FIG. 9 illustrates an annular gas-solid contacting apparatus 200B which includes a cylindrical outer housing 205B and an axial column 206 which can be, for example, the riser portion of an FCC unit or other component. The stripping occurs in the annular space between inner column 206 and outer housing 205B in which the baffles 100 are positioned for gas-solid contacting. Other cross-sectional configurations, such as oval, triangular, and the like, can alternatively be used with or without an axial column such as 206.

EXAMPLE

The relationship between capacity and efficiency has been seen by experimentation in cold flow testing. Cold flow model experiments use actual catalyst and air to simulate the actual operation of an industrial FCC stripper. Tests were conducted to investigate the performance of prior art strippers and the new device. In the experiments, the fluidized catalyst was injected with a helium tracer gas prior to entering the stripper. The downflowing catalyst particles were contacted with upward flowing air. The ability to remove the tracer gas was measured over a range of catalyst flow rates and a number of equipment configurations and conditions. Samples were taken at the inlet and outlet of the stripper and at various points over the height of the stripper and analyzed for helium concentration.

Figure 10:
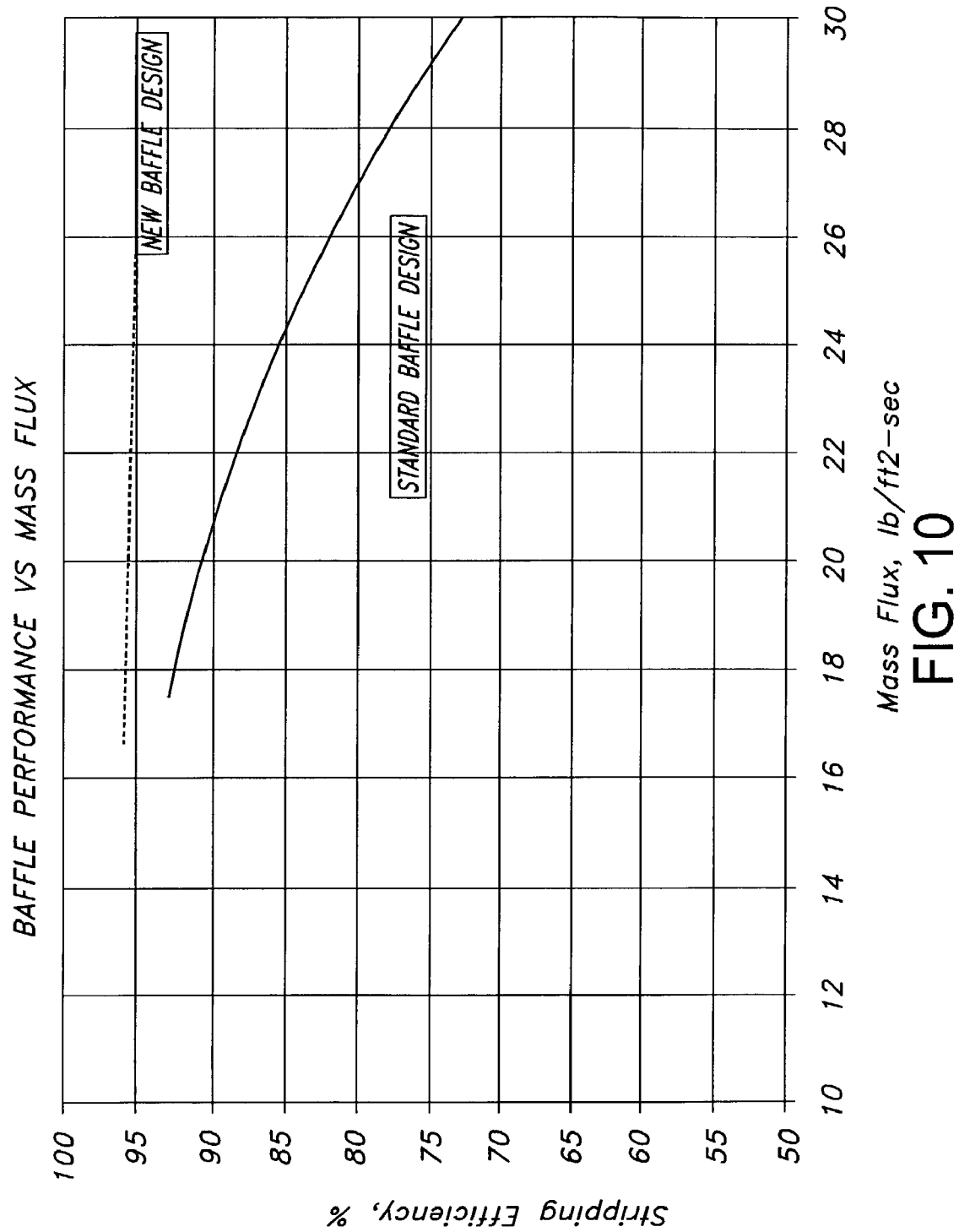

FIG. 10 shows the measured performance of the apparatus of the present invention using the new baffle arrangement as compared with a prior known conventional stripper using the prior known standard baffle design. The apparatus of the present invention exhibited an efficiency of at least 95% over the measured range of mass flux (lbs/sec-ft²), whereas the conventional stripper apparatus had a maximum efficiency of less than 94%, which rapidly dropped as the mass flux increased. For example, at a mass flux of 18 lbs/ft²-sec the efficiency of the baffle design of the present invention was about 96% and the efficiency of the prior known baffle design was about 93%. However, at 22 lbs/ft²-sec the efficiency of the prior known baffle design dropped to about 88%, and at 28 lbs/ft²-sec the efficiency of the prior known baffle design dropped to less than 78%, whereas the efficiency of the baffle design of the invention remained above 95% over the same range of mass flux. Thus, not only does the prior known apparatus have a lower efficiency, the efficiency drops at a much steeper rate as the mass flux increases.

While the above description contains many specifics, these specifics should not be construed as limitations on the scope of the invention, but merely as exemplifications of preferred embodiments thereof. Those skilled in the art will envision many other possibilities within the scope and spirit of the invention as defined by the claims appended hereto.

What is claimed is:

1. An apparatus for the countercurrent contacting of a gas and downflowing solid particles, which comprises:
   a) a housing at least partially defining an interior space;
   b) a plurality of baffles positioned within the interior space of the housing, the baffles being arranged in at least first and second vertically spaced levels in successively lower position, each of said at least first and second levels including a row of at least two baffles oriented substantially parallel to one another and inclined from horizontal orientation so as to laterally shift the direction of downflowing particles transversely as the particles move from one level to the next lower level,
   wherein the baffles each have first and second opposite and parallel serrated edges defining a baffle length, each serrated edge including alternate ridges and notches.

2. The apparatus of claim 1 wherein the ridges and notches of the first serrated edge are staggered with respect to the ridges and notches of the second serrated edge.

3. The apparatus of claim 2 wherein the notches define an angle α, wherein α ranges from about 60° to about 120°.

4. An apparatus for the countercurrent contacting of a gas and downflowing solid particles, which comprises:
   a) a housing at least partially defining an interior space;
   b) a plurality of baffles positioned within the interior space of the housing, the baffles being arranged in at least first and second vertically spaced levels in successively lower position, each of said at least first and second levels including a row of at least two baffles oriented substantially parallel to one another and inclined from horizontal orientation so as to laterally shift the direction of downflowing particles transversely as the particles move from one level to the next lower level,
   wherein the baffles have a plurality of openings arranged in at least two parallel rows such that the openings of one row are staggered with respect to the openings of the adjacent row, and wherein the openings each have a diameter ranging from about 0.5 inches to about 6 inches.

5. The apparatus of claim 4 wherein the baffles are substantially planar.

6. An apparatus for the countercurrent contacting of a gas and downflowing solid particles, which comprises:
   a) a housing at least partially defining an interior space;
   b) a plurality of baffles positioned within the interior space of the housing, the baffles being arranged in at least first and second vertically spaced levels in successively lower position, each of said at least first and second levels including a row of at least two baffles oriented substantially parallel to one another and inclined from horizontal orientation so as to laterally shift the direction of downflowing particles transversely as the particles move from one level to the next lower level
   wherein the apparatus comprises at least four levels, and the direction of downflow of particles is shifted laterally by an angle of from about 45° to about 180° as the particles move from one level to the next succeeding lower level.

7. The apparatus of claim 6 wherein the baffles have a plurality of openings arranged in at least two parallel rows such that the openings of one row are staggered with respect to the openings of the adjacent row.

8. The apparatus of claim 6 wherein the angle is about 90°.

9. The apparatus of claim 8 wherein the lateral direction of down flowing particles at the third level is opposite to the lateral direction of downflowing particles at the first level, and the lateral direction of downflowing particles at the fourth level is opposite to the lateral direction of downflowing particles at the second level.

10. The apparatus of claim 6 wherein the baffles are inclined from a horizontal orientation by an angle β, wherein β ranges from about 20° to about 80°.

11. The apparatus of claim 6 wherein the housing possesses a quadrangular cross-section.

12. The apparatus of claim 6 wherein the housing possesses a circular cross-section.

13. A fluid catalytic cracking unit including a stripper for removing entrained hydrocarbon vapor from downflowing spent catalyst particles, the stripper comprising:
   a) a stripper housing;
   b) means for introducing a stripping gas into the stripper housing; and,
   c) a plurality of flat baffles positioned within the stripper housing, the baffles being arranged in at least first and second vertically spaced levels in successively lower position, each of said at least first and second levels including a row of at least two baffles oriented substantially parallel to one another and inclined from horizontal orientation so as to laterally shift the direction of downflowing catalyst particles transversely as the catalyst particles move from one level to the next lower level wherein the baffles each have first and second opposite and parallel serrated edges defining a baffle length, each serrated edge including alternate ridges and notches.

14. The fluid catalytic cracking unit of claim 13 wherein the baffles have a plurality of openings arranged in at least two parallel rows such that the openings of one row are staggered with respect to the openings of the adjacent row.

15. A fluid catalytic cracking unit including a stripper for removing entrained hydrocarbon vapor from downflowing spent catalyst particles, the stripper comprising:
   a) a stripper housing;
   b) means for introducing a stripping gas into the stripper housing; and,
   c) a plurality of flat baffles positioned within the stripper housing, the baffles being arranged in at least first and second vertically spaced levels in successively lower position, each of said at least first and second levels including a row of at least two baffles oriented substantially parallel to one another and inclined from horizontal orientation so as to laterally shift the direction of downflowing catalyst particles transversely as the catalyst particles move from one level to the next lower level, wherein the baffles each have first and second opposite and parallel serrated edges defining a baffle length, each serrated edge including alternate ridges and notches.

16. The fluid catalytic cracking unit of claim 15 wherein the ridges and notches of the first serrated edge of each baffle are staggered with respect to the ridges and notches of the second serrated edge.

* * * * *